(No Model.)

C. B. RAWSON.
JOINTED CURTAIN POLE FOR BAY WINDOWS.

No. 269,462. Patented Dec. 19, 1882.

Witnesses
F. J. Puffer
G. L. Greenleaf

Inventor
C. B. Rawson

UNITED STATES PATENT OFFICE.

CHARLES B. RAWSON, OF WORCESTER, MASSACHUSETTS.

JOINTED CURTAIN-POLE FOR BAY-WINDOWS.

SPECIFICATION forming part of Letters Patent No. 269,462, dated December 19, 1882.

Application filed April 6, 1882. (No model.)

*To all whom it may concern:*

Be it known that I, CHARLES B. RAWSON, a citizen of the United States, residing at Worcester, in the county of Worcester and State of Massachusetts, have invented a new and useful Improvement in Jointed Curtain-Poles for Bay-Windows and similar uses, of which the following is a specification.

My invention relates to the peculiar mode of uniting the ends of two curtain-poles by a joint which shall admit of a slight change in the angle formed by the two poles, adapting them to use in bay-windows of varying form; also, to the use of a ball against which the concave or "cupped" ends of the poles abut; also, to forming at the ends of the jointed poles a stationary curtain-ring to hold the curtain close against the joint.

Figure 1:
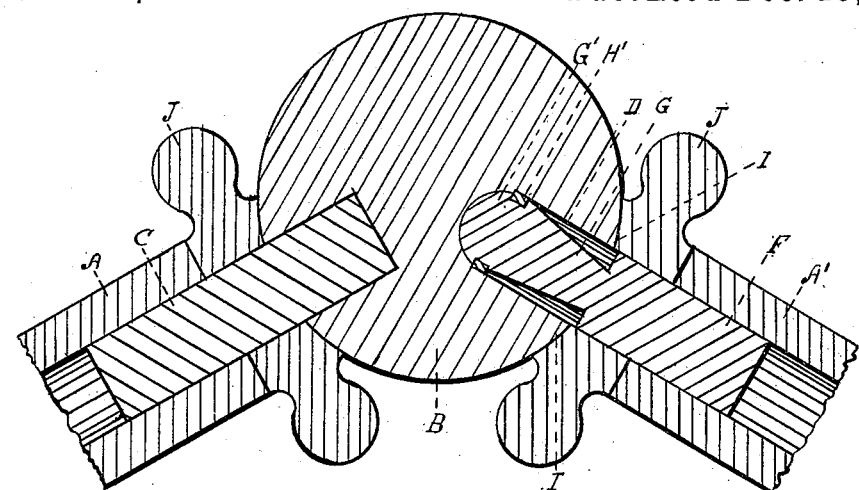
Figure 2:
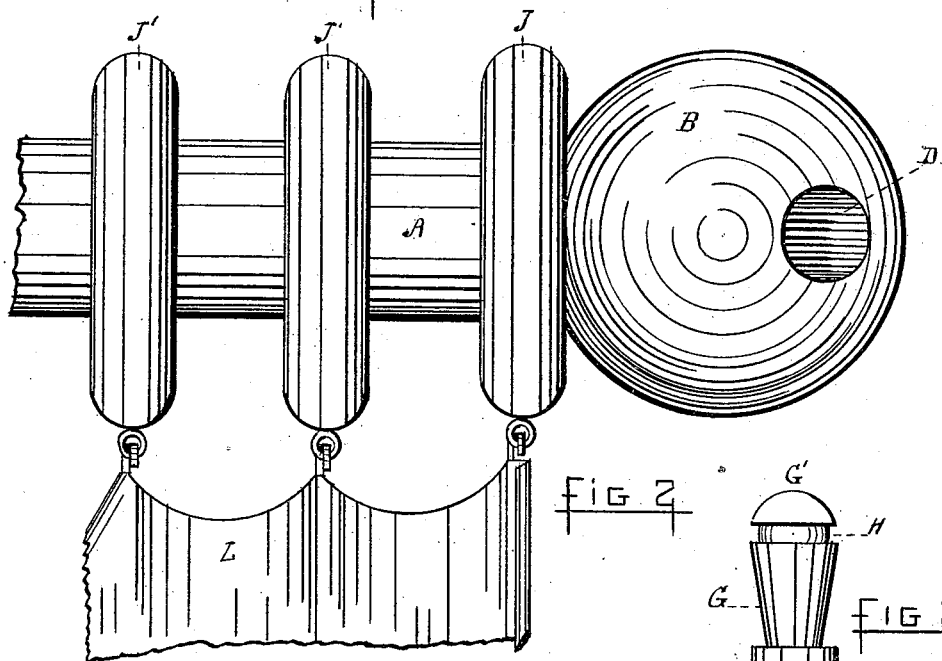
Figure 3:
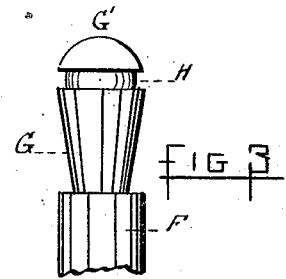
Figure 4:

The accompanying drawings illustrate my invention, in which Figure 1 shows a horizontal section of my improved joint; Fig. 2, a front view of the same having one pole removed; Fig. 3, a detached view of the tapering pin or tongue; and Fig. 4 represents the rubber band H'.

Similar letters refer to similar parts in the several views.

A A', Fig. 1, represent the ends of two curtain-poles, which, with the ball B, form my improved joint. The end A is fastened rigidly to the ball B by the dowel-pin C, or by any other suitable means. In the ball B is the hole D, in the same horizontal plane as the hole receiving the dowel-pin C, both being radial holes, and forming an angle of about sixty degrees.

Securely attached to the end of the pole A' is the dowel-pin F, whose projecting end has the reverse taper G, the spherical end G', and the groove H, in which is placed the rubber band H'. The end G' should nearly fill the hole D. The rubber band H', being compressed by the sides, will hold the end of the pole A' and the ball B together with sufficient firmness, while the tapering sides of the pin F will permit some motion of the pole A' around the ball B. The joint between the ball B and the pole A' is formed by making the end of the pole concave or cupped at I I, Fig. 1. This form gives an enlarged bearing-surface, and is also necessary to allow the end I I to cover the hole D in all positions. The tapering pin F' may be used without the rubber band H'; but the rubber band allows the pin F to be used with holes of varying size.

Between the ball B and the ends of the poles A A', I place the disks J J, whose outer edges are finished to correspond in form and appearance with the sliding rings J' J' used on the poles. Upon these stationary disks I fasten the ends of the curtain L to hold them close against the joint. The use of such a stationary fastening has been found to be necessary, as the loose sliding rings are apt to slide away from the joints at the corners of the windows and require to be frequently moved up with the hand, and the above-described mode of construction affords a means of attachment and secures the appearance of a sliding ring.

Curtain-poles for bay-windows, formed by inserting the ends of the poles rigidly in a ball or block of wood of some ornamental form, the two poles forming the desired angle, have been before used; also, a joint in the form of a hinge turning upon a pin passing vertically through the center of the ball has been in use before.

I am also aware that a joint formed by the use of a ball embraced by and turning in a socket is a well-known device; but

What I claim as new in the above-described construction, and desire to secure by Letters Patent, is—

1. In a jointed curtain-pole, the combination, with the ball B and attached pole end A, of the pole A', having the concave or cupped end I I and the tongue or pin G, as described, and for the purpose set forth.

2. In a jointed curtain-pole, the combination, with the ball B and attached pole A, of the movable pole A' and pin or tongue G, having tapering sides G', as described, and for the purposes set forth.

3. In a jointed curtain-pole constructed as described, the pin or tongue G, having a groove, H, and a rubber band, H', as and for the purposes set forth.

4. The combination, with a ball, B, having one or more radial holes, D, of a corresponding number of curtain-pole ends A', each having the concave or cupped end I I, the tapering pin G, with a groove, H, and rubber band H', all arranged and constructed as described, and for the purposes set forth.

C. B. RAWSON.

Witnesses:
F. J. PUFFER,
G. L. GREENLEAF.